Jan. 15, 1963 P. E. EWING 3,072,980
CENTRIFUGAL CASTING APPARATUS FOR MANUFACTURE OF PIPE
Filed April 11, 1960 10 Sheets-Sheet 1

PAUL E. EWING
INVENTOR.

BY Lyon Lyon
ATTORNEYS

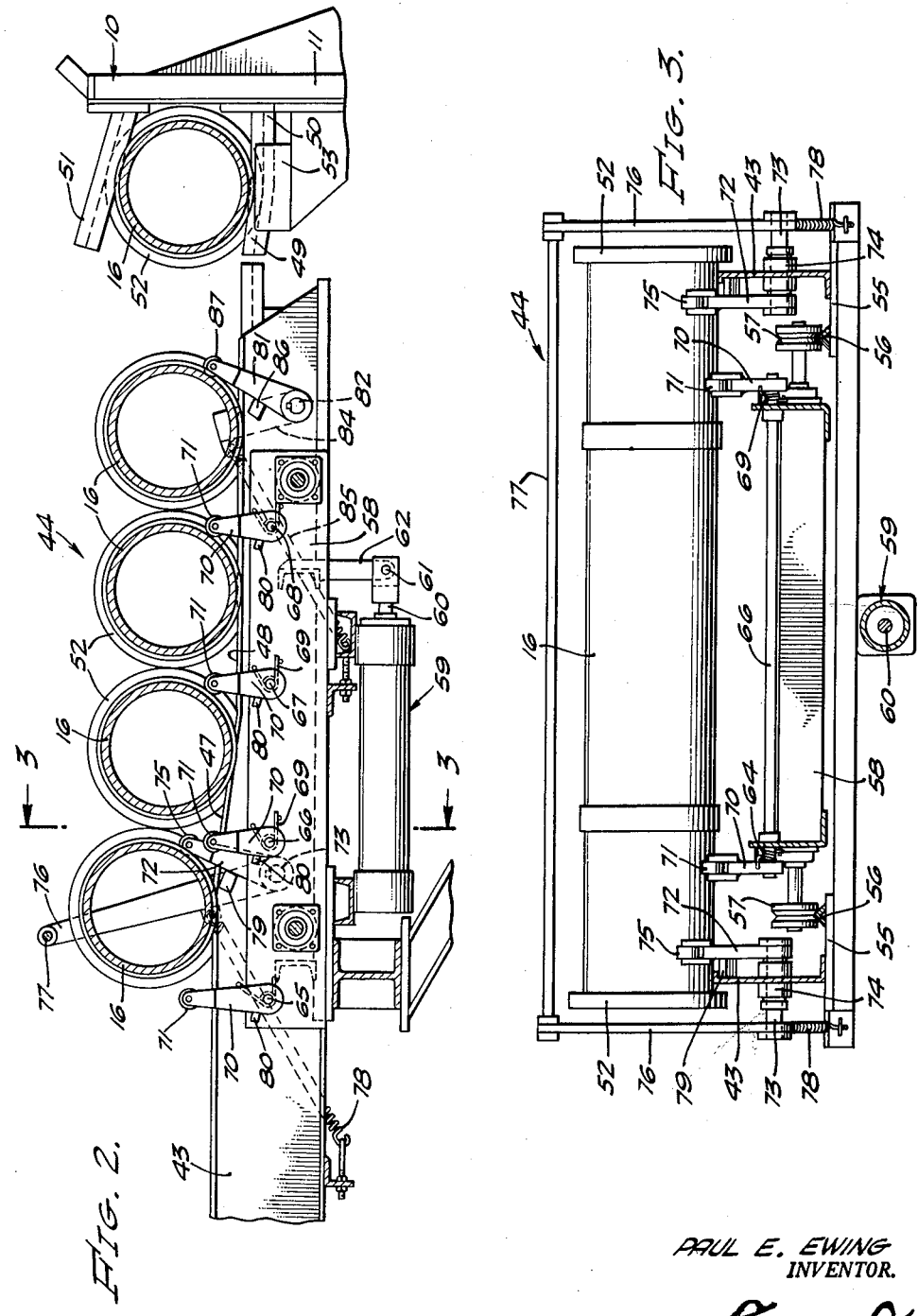

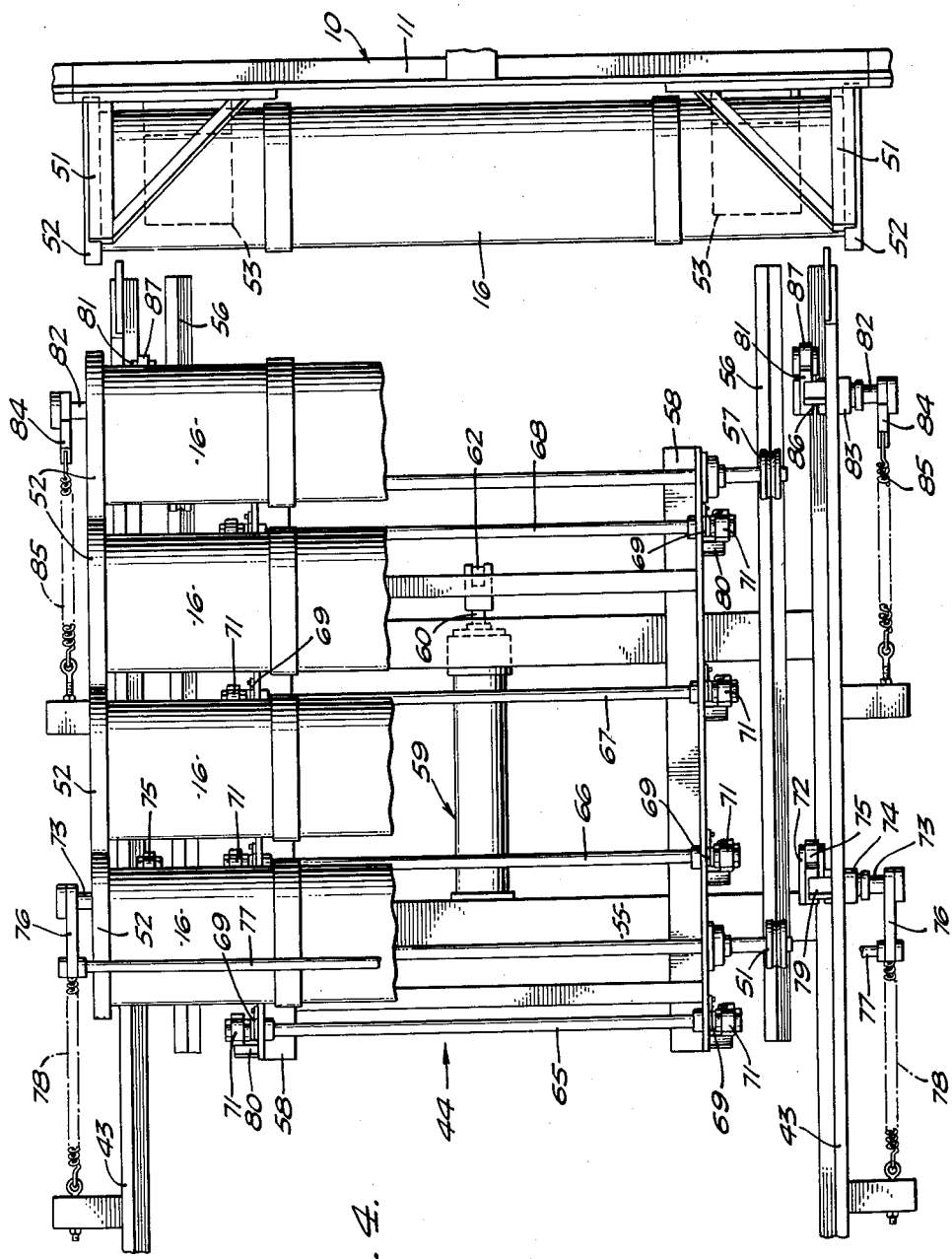

PAUL E. EWING
INVENTOR.

BY Lyon+Lyon
ATTORNEYS

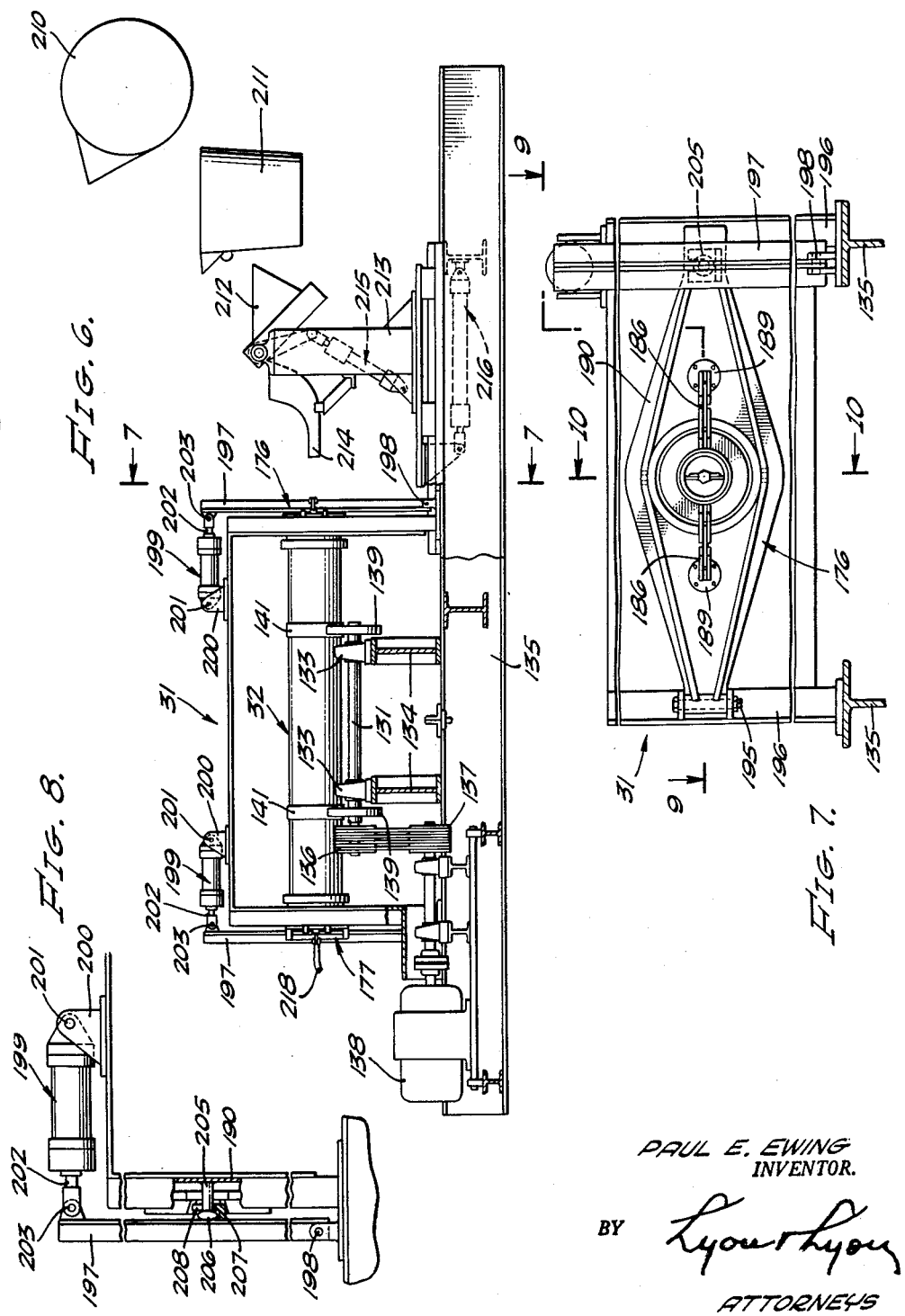

Jan. 15, 1963 P. E. EWING 3,072,980
CENTRIFUGAL CASTING APPARATUS FOR MANUFACTURE OF PIPE
Filed April 11, 1960 10 Sheets-Sheet 6
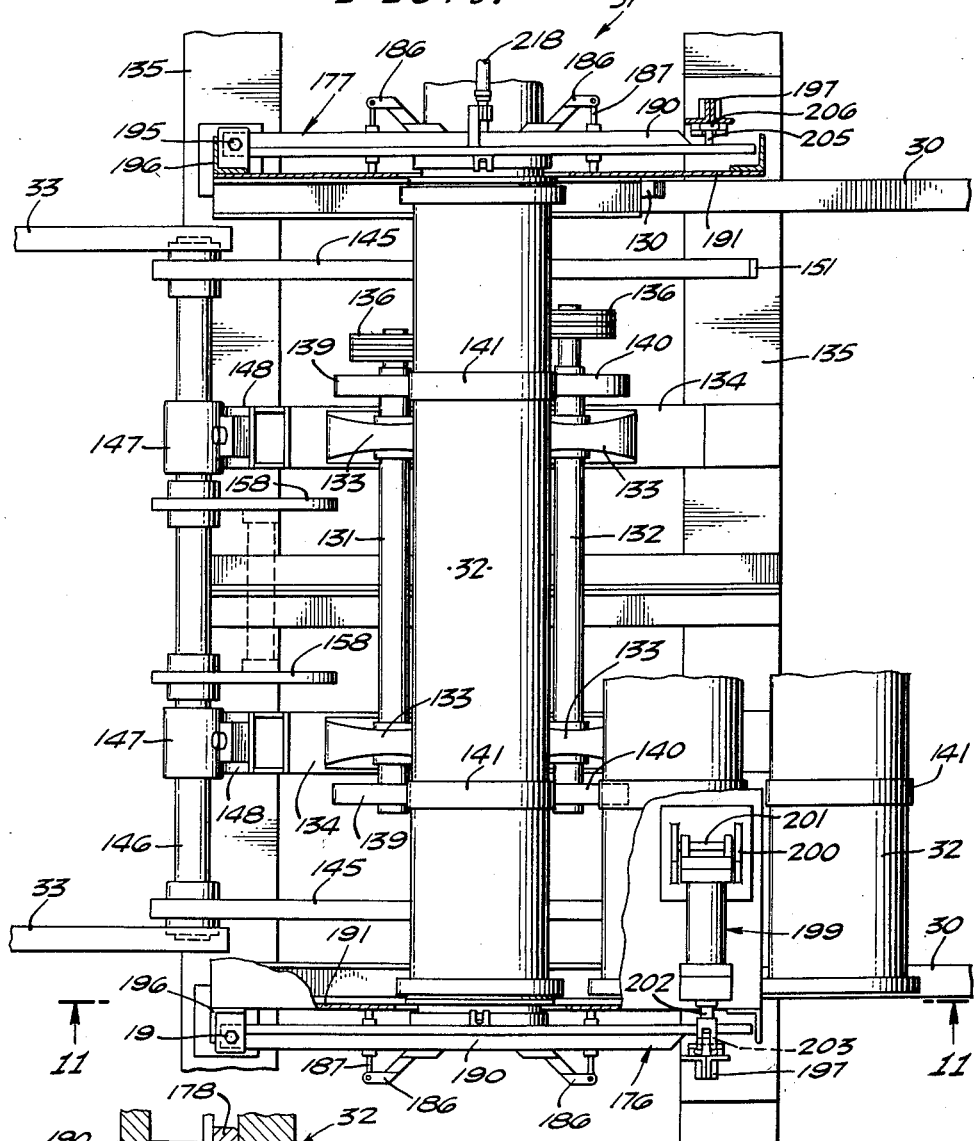
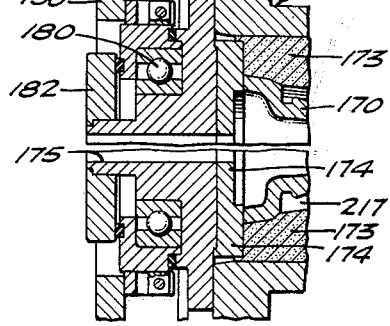
PAUL E. EWING
INVENTOR.
BY
ATTORNEYS

PAUL E. EWING
INVENTOR.

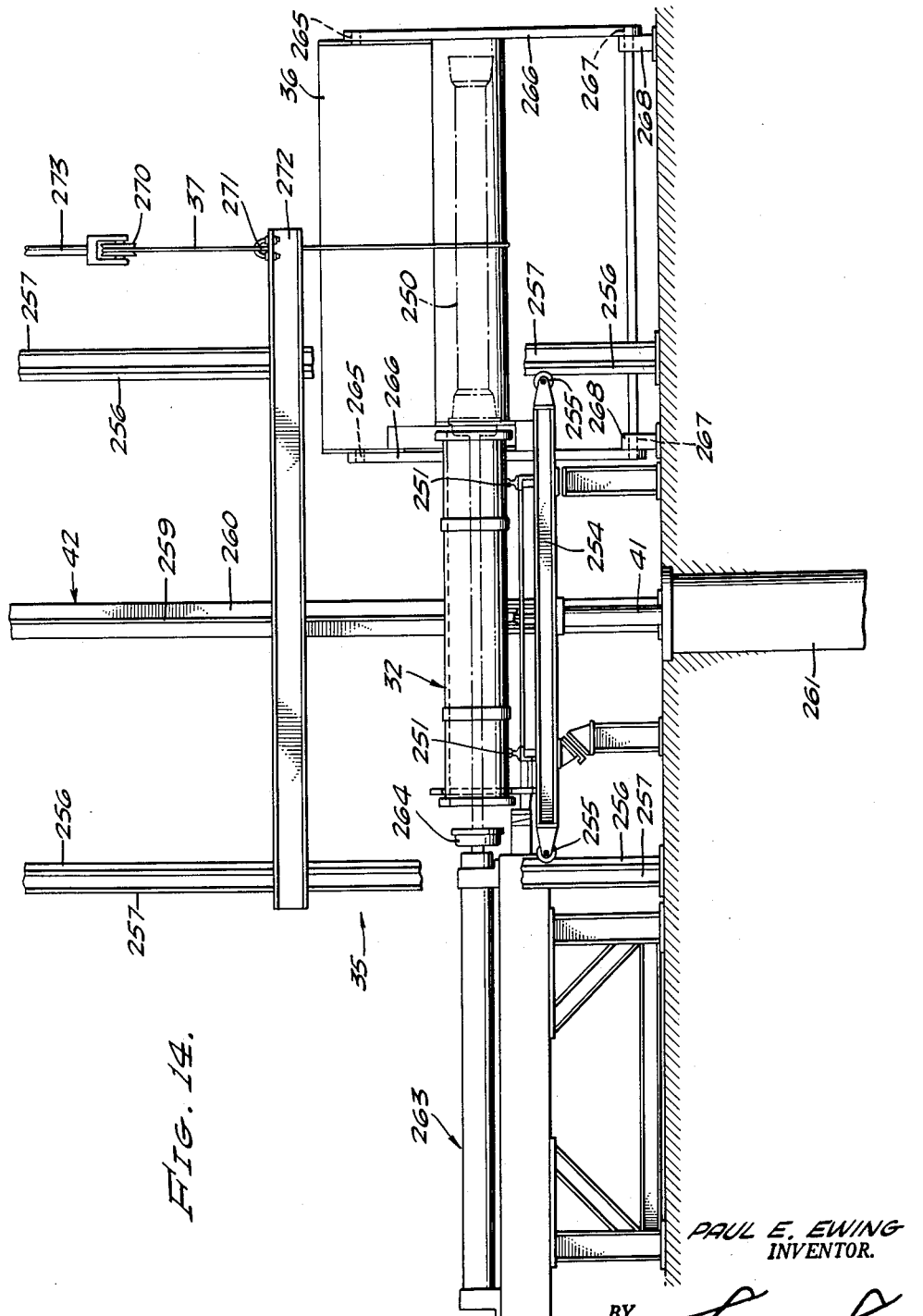

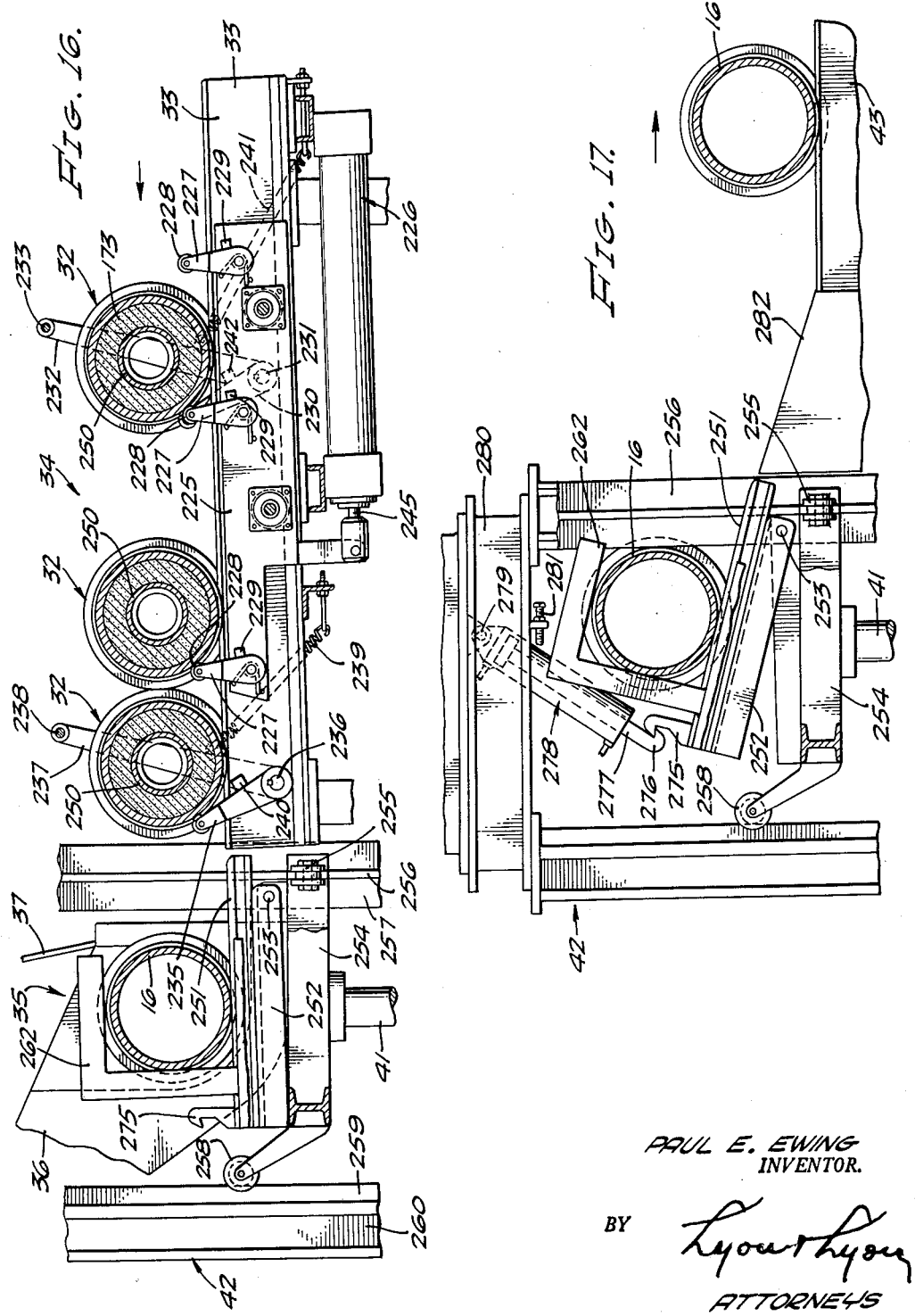

United States Patent Office 3,072,980
Patented Jan. 15, 1963

3,072,980
CENTRIFUGAL CASTING APPARATUS FOR MANUFACTURE OF PIPE
Paul E. Ewing, Huntington Park, Calif., assignor to Rich Manufacturing Company of California, Los Angeles, Calif., a corporation of California
Filed Apr. 11, 1960, Ser. No. 21,180
8 Claims. (Cl. 22—65)

This invention relates to centrifugal casting apparatus for the manufacture of pipe and is particularly directed to improvements over the apparatus shown in my prior Patent 2,879,563, granted March 31, 1959. In general terms the apparatus disclosed in that patent includes a rotary transfer member which receives a cylindrical metal flask in horizontal position and then turns it to an upright vertical position. While the flask is held in vertical position a retractable pattern is inserted upward into the interior of the flask and a sand-delivery mechanism is lowered to contact the upper end of the flask and the upper end of the pattern. Sand is then blown into the interior of the flask around the pattern to form a sand lining within the flask. The pattern is then withdrawn in a downward direction and the sand-delivery device is retracted upward away from the flask.

The transfer member then turns and deposits the sand-lined flask in horizontal position on rails leading to a spinning station where molten metal is poured into the spinning sand-lined flask, or mold. The molten metal solidifies while the mold is spinning and the mold then moves from the spinning station to a casting-ejection station. The casting, in the form of a length of pipe, is pushed axially out of the flask along with the sand lining. The casting and sand are then discharged laterally while the empty flask is elevated and deposited on rails leading to the transfer member. The cycle then repeats.

The present invention relates to improvements in the apparatus at the spinning station and at the ejection station, and improvements concerning the mounting of the sand-delivery device, as well as to improvements in controlling the rate of movement of flasks between the spinning station and the ejection station, and toward the rotary transfer member. With respect to the apparatus at the spinning station, the objects of the present invention include the provision of a novel transfer arm assembly for simultaneously moving a sand-lined flask or mold into spinning position while simultaneously moving a casting-containing mold out of the spinning apparatus. Another object is to provide a novel form of closure assembly for use with the mold at the spinning station, which assembly includes means for arresting free spinning movement of parts of the closure after discharge of the mold and casting from the spinning station. With regard to apparatus at the ejection station, the objects of this invention include the provision of novel means for discharging the casting and sand lining laterally from the machine while lifting the empty flask to a position from which it may roll off to elevated tracks for rolling movement towards the transfer member. Another general object of the invention is to provide novel feeder means for regulating the rate of movement of the casting-filled molds from the spinning station to the casting-ejection station, as well as to regulate the feeding of empty flasks from the elevated rails to the transfer member. Another object is to provide an improved form of lifting and guiding device for the sand-delivery apparatus with respect to the upper end of the vertical flask on the transfer member.

Other and more detailed objects and advantages will appear hereinafter.

In the drawings:

FIGURE 2 is a side elevation partly in section and partly broken away showing details of the feeder mechanism for regulating the rate of rolling movement of the empty flasks toward the rotary transfer member.

FIGURE 3 is a sectional elevation taken substantially on the lines 3—3 as shown in FIGURE 2.

FIGURE 4 is a plan view of the device shown in FIGURE 2.

FIGURE 6 is an end elevation partly in section and partly broken away showing details of the apparatus at the spinner station.

FIGURE 7 is a side elevation partly in section taken substantially on the lines 7—7 as shown in FIGURE 6.

FIGURE 8 is a fragmentary enlargement of a portion of the apparatus shown in FIGURE 6.

FIGURE 9 is a plan view partly in section and partly broken away and taken substantially on the lines 9—9 as shown in FIGURE 7.

FIGURE 10 is a sectional detail taken substantially on the lines 10—10 as shown in FIGURE 7.

FIGURE 14 is an end elevation taken substantially on the lines 14—14 as shown in FIGURE 15 but with the parts shown in lower position.

FIGURE 16 is a side elevation partly broken away and partly in section showing details of the feeder mechanism for controlling the rate of rolling movement of the casting-filled molds toward the ejection station.

FIGURE 17 is a fragmentary side elevation showing the upper portion of FIGURE 15 on an enlarged scale.

Figure 1:
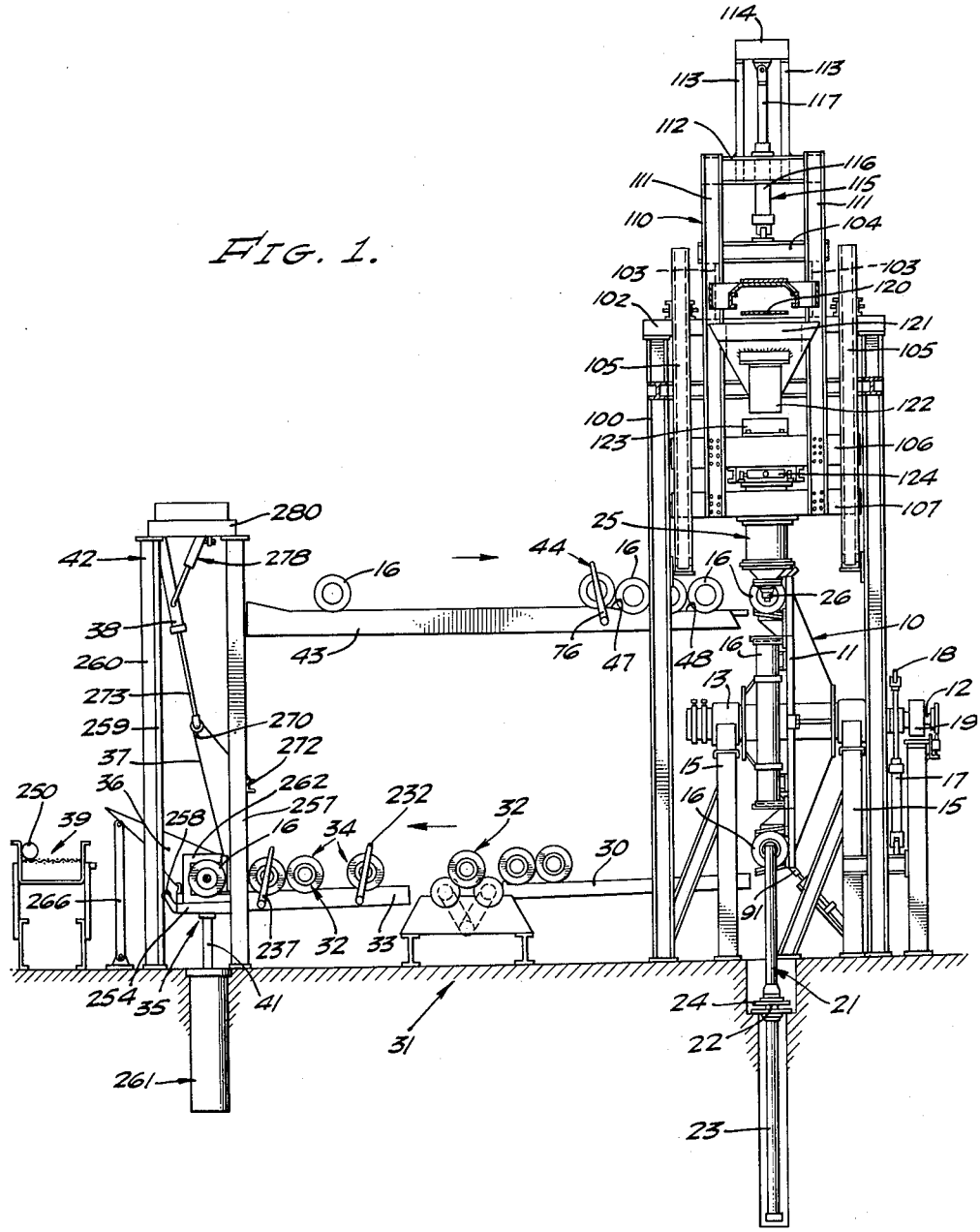
FIGURE 1 is a side elevation in diagrammatic form of a centrifugal casting apparatus embodying this invention.

Referring to the drawings, the general arrangement includes a rotary transfer member 10 which may be similar to that disclosed in my prior Patent 2,879,563. This rotary transfer member 10 includes a framework 11 fixed on a central horizontal shaft 12. The shaft 12 is supported in axially spaced bearings 13 and 14 mounted on pedestals 15. The framework 11 is positioned between the bearings 13 and 14. Four flask-receiving seats are provided on the front face of the framework 11 and each of these seats is adapted to receive and hold a hollow cylindrical flask 16. Power means in the form of a power cylinder 17 acting through crank arm 18 and a one-way clutch 19 serves to turn the shaft 12 and transfer member 10 through one-quarter turn increments. A retractable pattern 21 is mounted on the upper end of a piston rod 22 extending upward from a power cylinder assembly 23. When the piston rod 22 is projected upward, the pattern 21 moves longitudinally into the bore of the vertical flask 16. A sealing plate 24 resiliently mounted on the piston rod 22 contacts the lower end of the vertical flask 16. The sand-delivery device generally designated 25 has a nozzle 26 at the lower end thereof and when the device 25 is lowered to contact the upper end of the flask 16 the nozzle acts as a pilot and telescopes into the upper end of the pattern 21 to hold it in central position and thus forms a part of the pattern (see FIGURE 5). The apparatus for guiding and raising and lowering the sand-delivery device is described hereinafter.

After the vertical flask 16 has been lined with sand and after the sand-delivery device 25 has been retracted in an upward direction and the pattern 21 retracted in a downward direction, the rotary transfer member 10 is turned through one-quarter revolution to bring the sand-lined flask into horizontal position adjacent the stationary rails 30. The sand-lined flask is then released from its seat on a framework 11 and rolls along the rails 30 toward the spinning station generally designated 31. The construction and operation of the mechanism at the spinning station 31 is described below. When the sand-lined flask or mold 32 has received molten metal and after the casting has begun to cool, the casting-containing mold is deposited on rails 33 and feeder device generally designated 34 controls the rate of rolling movement of the casting-filled molds 32 to the casting-ejection station generally designated 35. The casting and sand lining are ejected axially from the hollow flask into a tiltable hopper 36 and the hopper is then raised by means of the cable 37 and power cylinder 38 to discharge the pipe casting and sand into the oscillating conveyor 39. The empty flask 16 is lifted by power cylinder assembly 41 to the upper portion of the tower 42 and discharged laterally onto the upper trackway or rails 43. The empty flask rolls on the rails 43 to the feeder assembly generally designated 44, and is again received in horizontal position on one of the seats on the rotary transfer member 10. The cycle then repeats.

The feeder mechanism generally designated 44 is shown in detail in FIGURES 2, 3 and 4. The purpose of this feeder mechanism 44 is to control the rate of rolling movement of the hollow cylindrical flask 16 toward the rotary transfer member 10. The rails 43 are provided with an inclined section 47 and a substantially horizontal portion 48 at the lower end of the section 47. The projecting ends 49 of the brackets 50 on the framework 11 of the transfer member 10 are brought into alignment with the section 48 of the elevated tracks 43 so that a hollow cylindrical flask 16 may roll directly onto the brackets 50. Inclined brackets 51 also affixed to the framework 11 of the rotary member 10 contact the outer surface of the flask 16, and the pairs of spaced brackets 49 and 51 on the framework 11 thus provide seats for maintaining the flask 16 in position on the rotary member 10. Each of the brackets 49 and 51 is notched to receive a portion of the end flanges 52 on the flask 16, and this prevents endwise movement of the flask relative to the framework 11. Electromagnets 53 are employed to maintain the flask 16 in position on the seat defined by the brackets 49 and 51.

Supporting structure 55 for the rails 43 carries angle irons 56 extending parallel to the rails 43. These angle irons provide parallel tracks for four supporting wheels 57 for the rolling carriage 58. A power cylinder assembly 59 is carried on the support structure 55 and the piston rod 60 which projects horizontally therefrom is connected at 61 to the lower end of a bracket 62 affixed to the rolling carriage 58. When the piston rod 60 is projected to the right as shown in FIGURE 2, the rolling carriage 58 moves toward the transfer member 10. The rolling carriage 58 is provided with four parallel crossrods 65, 66, 67 and 68 each mounted to turn about its axis and each resiliently maintained in position by means of torsion spring 69. Each of these rods carries a pair of upright fingers 70 mounted at opposite ends of the rod and each finger carries a roller 71 at its upper end. The springs 69 hold each of the fingers 70 against a stop lug 80 mounted on the rolling carriage 58. The fingers 70 each constitute a resiliently mounted bumper designated to feed rolling movement of the flask 16 toward the transfer member 10.

Additional fingers 72 are mounted on axially aligned stub shafts 73 mounted in bearing 74 carried on the rails 43. The projecting ends of these fingers 72 are provided with rollers 75. The stub shaft 73 is connected for simultaneous turning movement by means of the radial arms 76 and the tie-rod 77. The coil springs 78 attached to the arms 76 act resiliently to maintain the fingers 72 against the stop lugs 79. Another set of fingers 81 are carried on aligned pivot shafts 82 mounted in bearings 83 on the rails 43. A radial arm 84 is fixed to each of the stub shaft 82 and a coil spring 85 acts resiliently on each arm 84 to hold the fingers 81 against the stop lugs 86. The upper end of each of the fingers 72 and 81 is provided with a roller 87.

In the operation of the feeder device 44 as shown in FIGURES 2, 3 and 4, empty flasks 16 roll along the upper surface of the rails 43. Four empty flasks 16 are normally maintained in position by the feeder device. When the transfer member 10 is rotated 90° to present an empty seat for reception of the flask 16, the power cylinder 59 is actuated to project the piston rod 60 and thereby move the rolling carriage 58 toward the transfer member 10. Each of the fingers 70 engages its respective stop lug 80 and the roller ends of the fingers each contact one of the flasks 16 and advance it along the rail sections 47 and 48. The flask 16 at the forward end of the feeder device adjacent to transfer member 10 is caused to roll into position between brackets 49 and 51, depressing the fingers 81 against the action of the springs 85. The piston rod 60 is then retracted, causing the rolling carriage 58 to move to the left as viewed in FIGURE 2 away from the transfer member 10. This causes each of the resiliently mounted fingers 70 to swing against the action of the springs 69 and move under one of the flasks 16. The fingers 72 also move under one of the flasks 16 upon retracting movement of the rolling carriage 58, extending the springs 78. The fingers then all move back against their respective stop lugs. Another empty flask 16 rolls down the elevated tracks 43, depresses the first finger 70 which it encounters and comes to rest against the fingers 72. The arm 76 and tie-rod 77 cause the fingers 72 to move in unison. This causes the flask 16 to come to rest with its axis at right angles to the path of rolling movement. Suitable timing and interlock means (not shown) may be provided to coordinate the reciprocating motion of the rolling carriage 68 with the intermittent turning movement of the transfer member 10.

When the empty flask 16 has been swung from horizontal loading position to vertical sand-lining position on the rotary transfer member 10 a retractable latching dog 91 engages a portion of the framework 11 to hold the rotary transfer member 10 in fixed position. The pattern 21 is lifted and projected into the hollow interior of the vertical flask 16 and the plate 24 engages the lower end of the flask to form a seal. The sand-delivery device 25 is lowered to bring the projecting end into engagement with the upper end of the pattern 21, thereby centering the pattern to produce an annular space 92 of uniform dimensions between the pattern 21 and the bore 93 of the flask 16. Sand is then blown through ring orifices 94 into the annular space and thus forms a lining of uniform dimensions and substantially uniform density. At the completion of the sand-filling operation the pattern 21 is withdrawn downward and the sand-delivery device 25 is lifted vertically upward for a sufficient distance to provide clearance for swinging another empty flask into vertical position on the rotary transfer member 10.

The means for supporting and raising and lowering the sand-delivery device 25 is best shown in FIGURE 1. Primary support columns 100 and 101 are connected by a crossbeam 102 at their upper ends and pedestals 103 mounted on this crossbeam support a stationary horizontal beam 104. Four stationary guide channels 105 are mounted on the columns 100 and 101 and are connected to the crossbeam 102. Each of these channels 105 receives a guide bar (not shown) in sliding relationship and these guide bars are fixed to the crossframes 106 and 107. These carry the sand-delivery device 25. Crossframes 106 and 107 are affixed to and form a part of a vertically movable carrier 110 which includes parallel longitudinal members 111. A boxframe 112 connects the upper ends of the members 111. Vertical members 113 are affixed to this boxframe 112 and connected by the crown piece 114. A power cylinder assembly generally designated 115 is positioned directly above the vertical flask 16 and this assembly includes a stationary cylinder 116 projecting through a clearance space in the boxframe 112 and having a piston rod 117 connected to the crown piece 114. The lower end of the cylinder 116 is connected to the stationary horizontal beam 104 on the hydraulic cylinder assembly 115 and is actuated to project the piston rod 117. The entire vertically movable carrier 110 including the parts 106, 107, 111, 112, 113, 114 are lifted vertically and are guided in this vertical movement by means of the guide channels 105. The sand-delivery device 25 moves upward as an integral part of the vertically movable carrier 110.

Sand carried on a horizontal conveyor belt 120 passing between the longitudinal member 111 of the vertically movable carrier 110 may be deflected by means (not shown) into the stationary hopper 121. The sand then passes through the hopper outlet 122 into the upper end 123 of the sand-delivery device 25. The sand-delivery device 25 includes a horizontal slide-valve assembly 124 which may be a conventional design and serves to control the amount of sand delivered to the lower end of the device 25. Compressed air is used in a conventional manner to blow sand from the device 25 through the nozzle 26 into the interior of the vertical flask 16.

Figure 11:
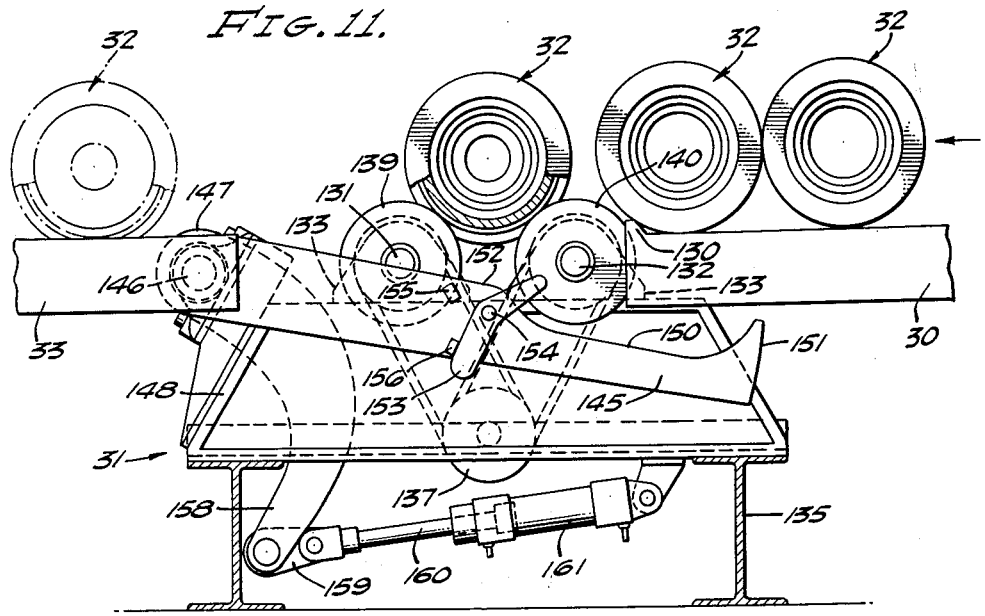
FIGURE 11 is a sectional side elevation taken substantially on the lines 11—11 as shown in FIGURE 9 and illustrating the transfer arms in lower position.
Figure 12:
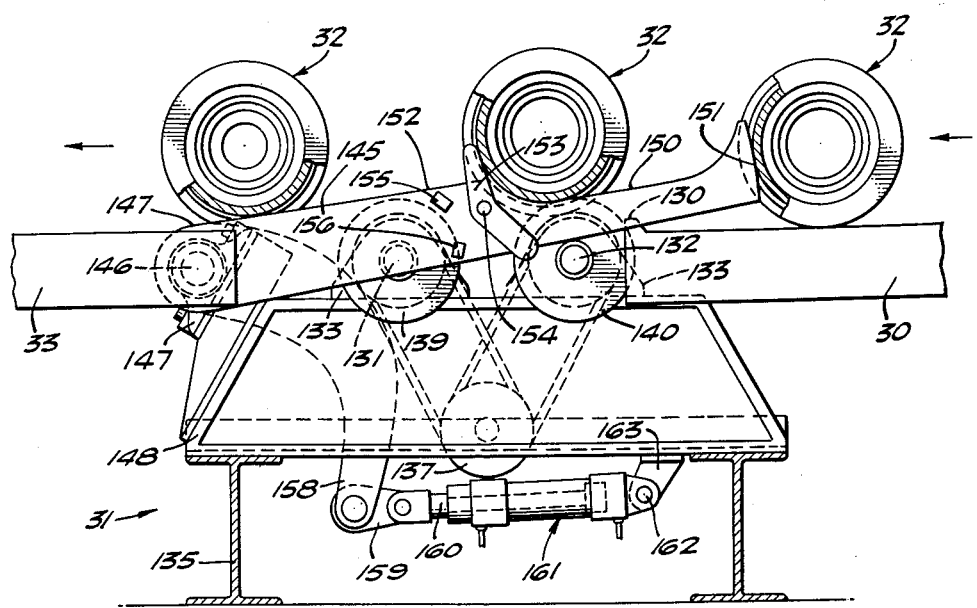
FIGURE 12 is a view similar to FIGURE 11 but with the transfer arms shown in upper position.
Figure 13:
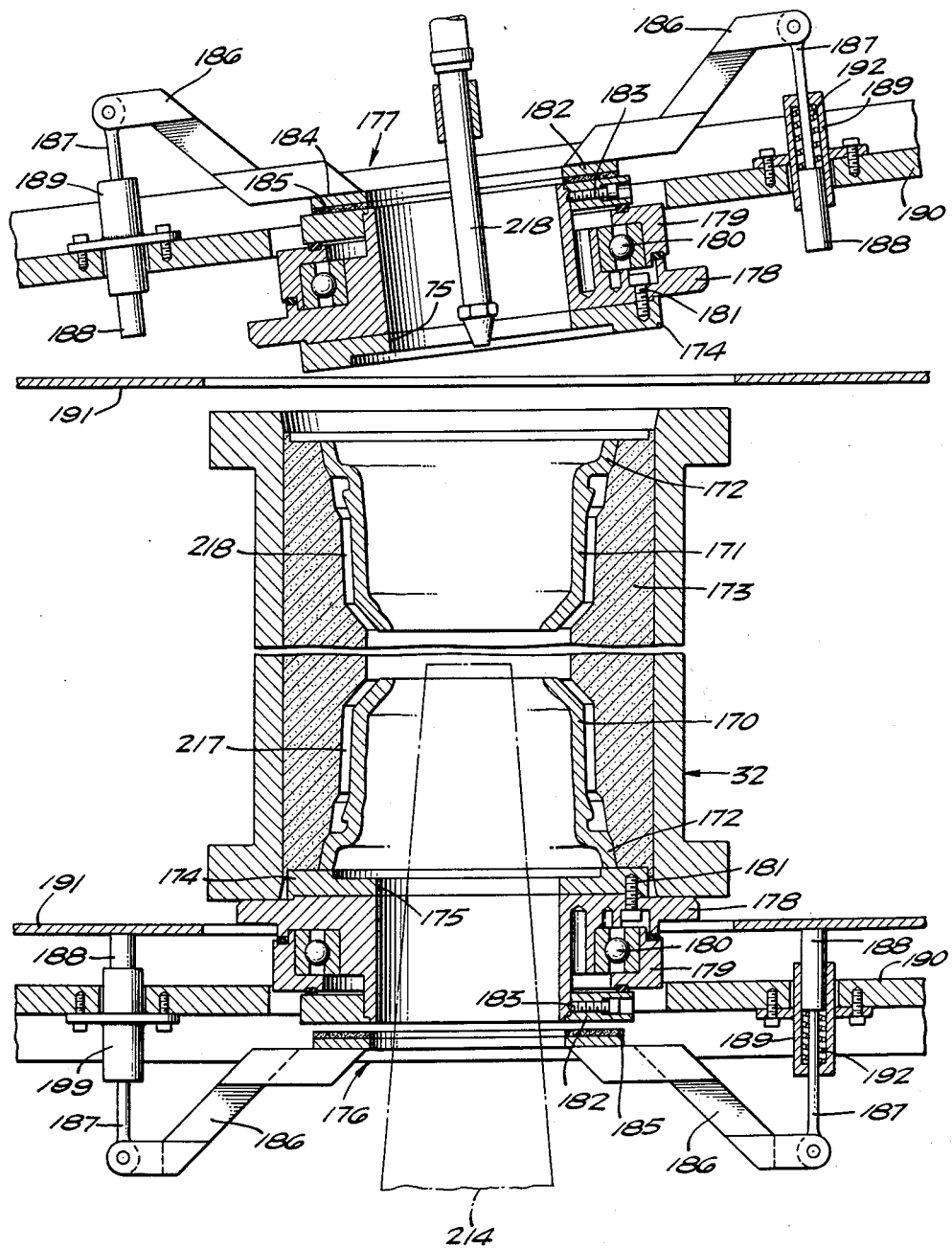
FIGURE 13 is a horizontal section view taken along the axis of a mold in spinning position.

When the sand-lined flask or mold 32 rolls from the lower end of the rotary transfer member onto the rails 30, it rolls down the rails until it encounters another similar sand-lined flask or mold. As shown in FIGURES 11 and 12 the tracks 30 are each provided with an abutment 130 which arrests forward rolling movement of the mold 32. These abutments 130 are placed at the lower ends of the rails 30 at the spinning station generally designated 31. The apparatus at the spinning station is best shown in FIGURES 6–13. It includes parallel horizontal shafts 131, 132 mounted in axially spaced bearings 133. The bearings 133 are mounted on parallel crossbeams 134 supported on subframe 135. Each shaft has a driven pulley 136 mounted thereon and these pulleys are belt-driven from a single driving pulley 137 powered by an electric motor 138. Each of the shafts 131 and 132 is provided with axially spaced spinning rolls 139, 140. Rings 141 are provided on each of the flasks and are axially spaced for contact with the spinning rolls 139 and 140.

Novel means is provided for simultaneously transferring a sand-filled mold 32 into a spinning position on the rolls 139 and 140 while at the same time transferring a casting-containing mold out of spinning position and onto the discharge rails or tracks 33. A pair of duplicate transfer arms 145 fixed to the rockshaft 146 extend under the molds 32. The rockshaft 146 and transfer arms 145 are omitted in FIGURE 6 for clarity of illustration but are clearly shown in FIGURES 9, 11 and 12. The rockshaft 146 is supported in axially-spaced bearings 147 carried on supporting structure 148. Each transfer arm has a recess 150 formed in its upper surface near the swinging end thereof and also has an abutment 151 at extreme end thereof. When the arms 145 are raised from the position shown in FIGURE 11 to the position shown in FIGURE 12, the upper surface of 152 of the arms engages under the casting-filled mold 32 which is in spinning position on the rolls 139 and 140. The recessed portion 150 of the arms engages under the next adjacent sand-filled mold which is to be moved into spinning position. The end surface abutment 151 contacts the next adjacent mold 32 to hold it back and prevent it from being lifted by the arms 145.

A gravity actuated trigger 153 is pivotally mounted at 154 on each of the arms 145 at a location near the juncture of the recess surface 150, and the upper surface 152 of the arms 145. Stop lugs 155 and 156 limit the pivotal movement of the trigger 153 in both directions. When the arms 145 are in the lower retracted position as shown in FIGURE 11, the triggers 153 pivot by gravity and lie against the limit stops 156. Accordingly, when the arms 145 are raised, the upper ends of the triggers 153 engage under the casting-filled mold 32 and cause it to move to the left as viewed in FIGURES 11 and 12. As the casting-filled mold 32 rolls down the inclined surface 152 of the arms 145 in raised position, as shown in FIGURE 12, the upper ends of the triggers 153 are contacted by the sand-filled mold being moved into spinning position. Should the mold tend to roll up and out of the recess 150 the triggers 153 strike the limit stops 155 to present an abutment, thereby preventing overtravel of the sand-filled mold 32.

The action of the surfaces 150 on the arms 145 is to lift the sand-filled molds 32 only to the extent sufficient to clear the abutments 130 and to roll over the surfaces of the rolls 140. The transfer of the sand-filled mold from its position at the end of the loading rails or tracks 30 into spinning position is therefore accomplished with the minimum of shock loading, and the sand lining is not disturbed.

The rockshaft 146 is turned by means of crank arm 158 fixed to the rockshaft and connected by link 159 to the piston rod 160 of the power cylinder assembly generally designated 161. The cylinder portion of the assembly is pivoted at 162 to a stationary bracket 163. When the cylinder assembly 161 is actuated to retract the piston rod 160, the rockshaft 146 is caused to turn in a counter-clockwise direction, thereby raising the transfer arms 145. When the interior of the cylinder assembly 161 is vented, the weight of the arms 145 and crank arm 158 returns the parts to the position shown in FIGURE 11 with the piston rod 160 in extended position.

It will be observed that a single raising movement of the arms 145 is effective to move a casting-filled mold from spinning position and at the same time move a sand-filled mold into spinning position. Acordingly, a single power stroke of the cylinder assembly 161 effects both of these operations.

When the sand-lined flask 32 is supported on the rolls 139 and 140 in spinning position, end closures are swung into position to prevent escape of molten metal from the ends of the mold as well as to hold in place core pieces which define the interior shape of the ends of the pipe casting. The cores 170 and 171 are of conventional refractory construction and are smooth on their outer surfaces. The large end 172 of each core fits snugly within the sand lining 173. Replaceable end plates 174 engage the end of the cores 170 and 171 and contact the end of the sand lining 173. The end plates 174 have a central aperture 175. The end plates 174 are carried on and form a part of the closure assemblies generally designated 176 and 177. These are substantially duplicates.

Each of these closure assemblies 176 and 177 includes a hollow rotary hub 178 mounted on a nonrotary ring 179 by means of a ball-bearing assembly 180. Threaded fastenings 181 connect the end plates 174 to the end flange of the hollow hub 178. Another end flange 182 is fixed to the hub 178 by means of threaded fastenings 183 and this end flange turns with the hub 178. A nonrotary brake disc 184 is annular in form and carries friction lining 185 which bears against the face of the flange 182. Arms 186 on the annular plate 184 are connected to parallel pins 187 having enlarged heads 188. These heads are guided for movement within spring housing 189 fastened to a swinging support 190. The heads 188 project through the support 190 and are adapted to contact stationary side plates 191 when the closure assemblies are in closed position. Springs 192 within the spring housings 189 hold a brake lining 185 against the flange 182 when the closures are swung to open position, but these springs 192 are compressed when the heads 188 contact the stationary parts 191, thereby moving the brake lining 185 away from the surface of the flange 182.

As best shown in FIGURE 7, the swinging support 190 is pivoted at 195 at a stationary up-right member 196 and the other end of the support 190 is actuated by means of an actuator member 197 pivoted at 198 to the stationary member. As shown in FIGURE 8 a power cylinder assembly 199 is connected to a stationary bracket 200 by means of pivot pin 201 and the piston rod 202 is pivotally connected at 203 to the actuator member 197.

The swinging support 190 is provided with a horizontal bar 205 near its swinging end and this bar has an enlarged head 206. A bracket 207 fixed on the actuator member 197 contains a slot 208 which loosely receives the bar 205 and defines a pocket for reception of the enlarged head 206. Sufficient looseness is provided to allow the actuator member 197 to swing about its pivot 198 thereby moving the swinging support 190 about its pivot 195. The required range of movement is not great and the angularity of the swinging support 190 is exaggerated in the upper portion of FIGURE 13 for the purposes of illustration.

In operation, one of the sand-lined flasks or molds 32 is placed in spinning position on the rolls 139 and 140 by means of the transfer arms 145, as described above. The power cylinder assemblies 199 are actuated to swing the closure assemblies 176 and 177 into position to close the ends of the mold 32. The end plates 174 engage the sand lining 173 and the flanged hubs 178 engage the end faces of the flask. The swinging movement of the closure assemblies 176 and 177 is accomplished by energizing the power cylinder assemblies 199 in another direction to retract their respective piston rods 202. The actuator members 197 then apply a closing force to the swinging supports 190 so that endwise pressure is applied to both ends of the mold 32. Closing movement of the assemblies 176 and 177 is accompanied by separation of the friction lining 185 from the brake flanges 182 as described above. This allows the hollow hubs 178 to spin freely with the mold 32.

When the mold 32 is spinning on the rollers 139 and 140 under power supplied by the electric motor 138, molten metal previously transferred from the ladle 210 to the reservoir ladle 211 is poured into the receptacle 212 after the carriage 213 has been moved to place the spout 214 within the interior of the rotating mold 32. The receptacle 212 is tilted to discharge molten metal through the spout 214 by means of the power cylinder assembly 215 mounted on the carriage 213. Movement of the carriage is controlled by means of the power cylinder assembly 216. The pouring spout extends into the interior of the spinning mold 32 beyond the end of the adjacent core 170 and the molten metal fills the spaces 217 and 218 defined between the sand lining 173 and the outer surfaces of the cores 170 and 171. The outline of the pouring spout 214 is shown in phantom lines in FIGURE 13 and it will be observed that the spout extends through the central aperture in the hub 178 and replaceable end plate 175. When the pouring operation is completed, the carriage 213 is retracted by means of the power cylinder 216, thus withdrawing the pouring spout 214 to an inoperative position as shown in FIGURE 6.

The power cylinder assemblies 199 are then actuated to project their respective piston rods and thereby swing the closure assemblies 176 and 177 to open position away from the composed ends of the casting-filled mold 32. The brake linings 185 automatically engage the brake flanges 182 to arrest spinning movement of the hubs 178 and related parts. Accordingly, the hubs will not be spinning when they are re-engaged with the next sand-filled mold to be positioned on the rolls 139 and 140, and hence wear on the ends of the molds and disturbance of the cores and sand lining is minimized.

Just prior to moving the closure assemblies 176 and 177 water may be introduced through the spray nozzle 218 to assist in rapid cooling of the casting within the sand lining 173. The nozzle may be mounted in any convenient manner on one of the swinging supports 190.

As the casting-filled molds 32 leave the spinning station 31 and roll down the track 33 they encounter the retarder and feeding device 34. This device is best shown in FIGURE 16 and is similar in construction in operation to the feeder device 44 previously described. The rolling carriage 225 is shifted axially of the rails by means of the power cylinder assembly 226, and the rolling carriage is provided with three pairs of upstanding fingers 227. Each finger is provided with a roller 228 at its upper end. Spring means (not shown) act resiliently on each finger 227 to hold it in contact with its respective limit stop 229. Additional outstanding fingers 230 are pivotally mounted on the rails at 231 and are connected for simultaneous movement by means of radial arms 232 and a tie-rod 233. Similarly, fingers 235 are pivotally mounted at 236 on the rails 33 and are connected for simultaneous movement by means of radial arms 237 and tie-rod 238. The fingers 230 and 235 are each provided with a roller at their extending ends. Coil springs 239 act on the radial arms 237 to maintain the fingers 235 against limit stops 240. Similarly, coil springs 241 act on radial arms 232 to maintain fingers 230 against limit stops 242.

When a casting-filled mold 32 is to be delivered from the feeder device 34 to the casting-ejection station 35, the power cylinder assembly 226 is actuated to extend the piston rod 245 and thereby move the rolling carriage 225 to the left as viewed in FIGURE 16. The upward projecting fingers 227 at the left-hand end of the rolling carriage 225 engage the casting-filled mold which lies adjacent the casting ejection station 35 and cause it to roll along the rails 33 toward the left, depressing the fingers 235 against the action of the springs 239. The same forward motion of the rolling carriage 225 causes the rearmost fingers 227 thereon to move the casting-filled mold 32 forward along the rails 33, depressing the fingers 230 against the action of the springs 241. When the next casting-filled mold 32 rolls down the rails 33 from the spinning station 31 it encounters the upstanding fingers 227 at the right-hand end of the carriage 225 and depresses them before coming to rest against the fingers 230.

In practice it is found to be desirable to maintain three casting-filled molds 32 in the feeder device 34 in order to provide adequate cooling time for the centrifugal castings 250 within the sand lining 173. When the carriage 225 is moved to the right by retracting the piston rod 245, the spring-pivoted fingers 227 are depressed and pass beneath the casting-filled molds 32 in the feeder device 34.

Parallel bars 251 provide a support for the casting-filled mold 32 at the casting-ejection station 35. These bars are carried on a subframe 252 which is pivoted at 253 to an elevator car 254. This car 254 is provided with side rollers 255 engaging vertical rails 256 provided on the tower columns 257. A third roller 258 rolls along a vertical rail 259 carried on the tower column 260. The piston rod 41 of the power cylinder assembly 261 serves to raise and lower the elevator car 254 with respect to the columns of the tower 42.

Figures 5, 15:
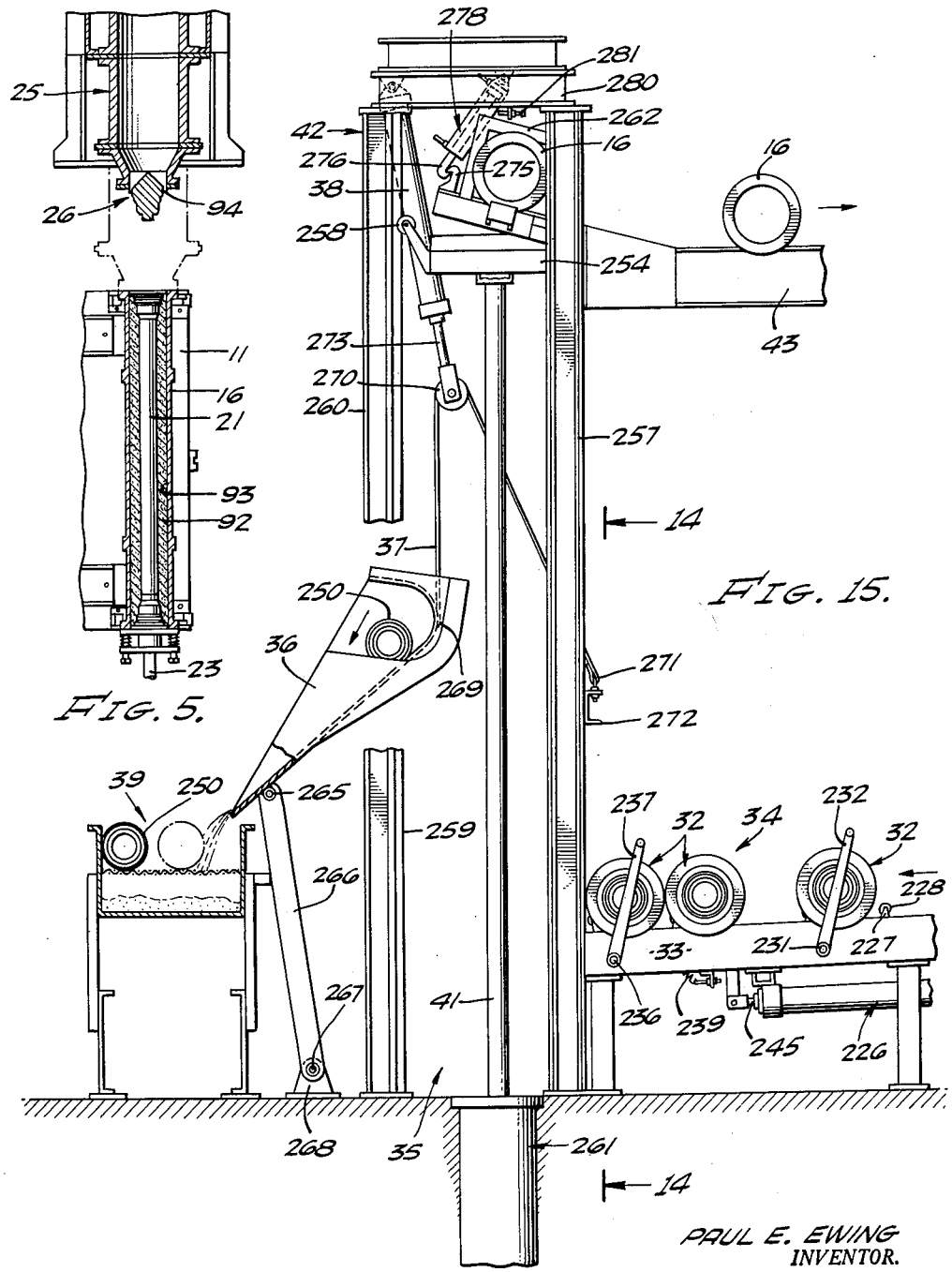
FIGURE 5 is a sectional elevation showing details of the sand-filling operation of the vertical flask.
FIGURE 15 is a side elevation showing apparatus at the casting-ejection station in elevated position and showing feeder apparatus controlling rolling movement of casting-filled molds toward the ejection station.

The bracket 262 is fixed relative to one of the rails 251 and is proportioned to engage the outer surface of the flask on a diameter smaller than that of the end flanges. A power cylinder assembly 263 carries a ramming head 264 which may be projected through the interior of the mold to eject the casting 250, sand lining 173 and cores 170 and 171. The casting, sand and cores are ejected into a tiltable hopper 36 as shown in FIGURE 15. This hopper is pivotally connected at 265 to the upper ends of upright bars 266. The bars 266 are pivoted at 267 to stationary brackets 268. The cable 37 is fixed to the tiltable hopper 36 at 269 and this cable passes over pulley 270 and is fixed at 271 to the stationary horizontal beam 272. When the power cylinder assembly 38 is actuated to retract the piston rod 273 and pulley 270, the pivoted hopper 36 is caused to move from the casting-receiving position shown in FIGURE 1 to the casting-dumping position shown in FIGURE 15. The hopper 36 deposits the castings, sand and cores on the oscillating conveyor 39.

After the casting, sand and cores have been ejected from the flask 16, the piston rod 41 is raised to lift the elevator 254 within the tower 42. A hook 275 fixed on the subframe 252 is engaged by a complementary hook 276 provided on the projecting end of a piston rod 277 forming part of the power cylinder assembly 278. This assembly is pivoted at 279 to the beam 280 at the upper end of the tower 42. A set screw 281 holds the power cylinder assembly 278 in proper angular position to cause automatic latching engagement between the hooks 275 and 276. Retraction of the piston rod 277 takes up lost motion between the parts 275 and 276 then serves to swing the subframe 252 about its pivot 253 thereby tilting the rails 251, and causing the hollow flask 16 to roll down the incline 282 and onto the elevated rails 43. After the flask 16 has rolled from the inclined rails 251, the power cylinder assembly 278 is actuated to project the piston rod 277 to the full extent. This serves to release the interengaging hooks 275 and 276 so that the elevator car 254, subframe 252 and related parts may be lowered back down to the initial position.

Having fully described my invention it is to be understood that I am not to be limited to the details herein set forth but that my invention is of the full scope of the appended claims.

I claim:

1. Centrifugal casting apparatus, comprising in combination: two pairs of axially spaced power driven rollers, the rollers being positioned to support a cylindrical mold in horizontal spinning position, means for supporting a cylindrical mold at a loading location adjacent said rollers, means for supporting a casting-filled mold at a discharge location adjacent said rollers, a rockshaft pivotally mounted adjacent said discharge location, a pair of transfer arms fixed to said rockshaft and extending below said loading location, a trigger pivotally mounted on each of the transfer arms near the mid-point thereof, stop means on each transfer arm for limiting pivotal movement of the trigger, and means for turning the rockshaft to raise the transfer arms whereby the triggers may contact a casting-filled mold in spinning position and cause it to roll along the transfer arms to said discharge location while the extending ends of the transfer arms raise another mold from said loading location and cause it to roll along the transfer arms into said spinning position.

2. Centrifugal casting apparatus, comprising in combination: parallel horizontal rotary shafts each provided with a pair of axially spaced rollers, power means for turning the shafts, the rollers being adapted to support a cylindrical mold in horizontal spinning position, means for supporting a cylindrical mold at a loading location adjacent one of the shafts, means for supporting a casting-filled mold at a discharge location adjacent the other of said shafts, a rockshaft pivotally mounted adjacent said discharge location, a pair of transfer arms fixed to said rockshaft and extending below said loading location, a trigger pivotally mounted on each of the transfer arms near the mid-point thereof, stop means on each transfer arm for limiting pivotal movement of the trigger in both directions, and power means for turning the rock shaft to raise the transfer arms whereby the triggers may contact a casting-filled mold in spinning position and cause it to roll along the transfer arms to the discharge location while the extending ends of the transfer arms raise another mold from the loading location and cause it to roll along the transfer arms into said spinning position.

3. Centrifugal casting apparatus, comprising in combination: parallel horizontal rotary shafts each provided with a pair of axially spaced rollers, power means for turning the shafts, the rollers being adapted to support a cylindrical mold in horizontal spinning position, a first track for delivering cylindrical molds to a loading location adjacent one of the shafts, a second track for carrying casting-filled molds away from a discharge location adjacent the other of said shafts, a rockshaft pivotally mounted adjacent said discharge location, a pair of transfer arms fixed to said rockshaft and extending below said loading location, a trigger pivotally mounted on each of the transfer arms near the mid-point thereof, stop means on each transfer arm for limiting pivotal movement of the trigger in both directions, and power means for turning the rockshaft to raise the transfer arms whereby the triggers may contact a casting-filled mold in spinning position and cause it to roll along the transfer arms to the second said track while the extending ends of the transfer arms raise another mold from said first track and cause it to roll along the transfer arms into said spinning position.

4. Centrifugal casting apparatus, comprising in combination: two pairs of axially spaced power driven rollers, the rollers being positioned adapted to support a cylindrical mold in horizontal spinning position, means for supporting a cylindrical mold at a loading location adjacent said rollers, means for supporting a casting-filled mold in a discharge location adjacent said rollers, a rockshaft pivotally mounted adjacent said discharge location, a pair of of transfer arms fixed to said rockshaft and extending below said spinning position, each of said transfer arms having a recess in the upper surface thereof extending from a mid-point to a location adjacent the swinging end of the arm, a gravity-actuated trigger pivotally mounted on each of the transfer arms near the mid-point thereof, stop means on each transfer arm for limiting pivotal movement of the trigger, and means for turning the rockshaft to raise the transfer arms whereby the triggers may contact a casting-filled mold in spinning position and cause it to roll along the transfer arms to the discharge location while the extending ends of the transfer arms raise a mold from the loading location and cause it to roll along said recesses into said spinning position.

5. Apparatus for moving cylindrical molds to and from a spinning station defined by power driven rollers cooperating to support and spin the molds about a horizontal axis, comprising in combination: loading rails leading to the spinning station, discharge rails leading away from the spinning station, the molds being adapted to roll on both the loading rails and the discharge rails, transfer means including pivoted arms extending in a direction parallel to the rails, power means for swinging said arms between a lowered position and an elevated position, said arms being engageable with the outer surfaces of two of the cylindrical molds during one stroke of the arms, the first mold being supported on the power driven rollers at the spinning station and the second mold being supported on the loading rails, whereby raising of the pivoted arms from lowered position to elevated position serves to lift the first mold and roll it onto the discharge rails and to raise the second mold and cause it to roll along said arms toward said spinning station.

6. Apparatus for moving cylindrical molds to and from a spinning station defined by power driven rollers cooperating to support and spin the molds about a horizontal axis, comprising in combination: loading rails leading to the spinning station, discharge rails leading away from the spinning station, the molds being adapted to roll on both the loading rails and the discharge rails, transfer means including pivoted arms extending in a direction parallel to the rails, power means for swinging said arms between a lowered position and an elevated position, said arms being engageable with the outer surfaces of two of the cylindrical molds during one stroke of the arms, the first mold being supported on the power driven rollers at the spinning station and the second mold being supported on the loading rails, means on said transfer means limiting the extent of rolling of said second mold, whereby raising of the pivoted arms from lowered position to elevated position serves to lift the first mold and roll it onto the discharge rails and to raise the second mold and cause it to roll along said arms to said limiting means, and subsequent lowering of said arms serving to rest the second mold on said power driven rollers.

7. Apparatus for moving cylindrical molds to and from a spinning station defined by power driven rollers cooperating to support and spin the molds about a horizontal axis, comprising in combination: loading rails leading to the spinning station, discharge rails leading away from the spinning station, the molds being adapted to roll on both the loading rails and the discharge rails, transfer means including pivoted arms extending in a direction parallel to the rails, power means for swinging said arms between a lowered position and an elevated position, said arms being engageable with the outer surfaces of two of the cylindrical molds during one stroke of the arms, the first mold being supported on the power driven rollers at the spinning station and the second mold being supported on the loading rails, each arm having a recess in its upper surface for engagement wtih the second mold, whereby raising of the pivoted arms from lowered position to elevated position serves to lift the first mold and roll it onto the discharge rails and to raise the second mold and cause it to roll along said arms toward said spinning station, and subsequent lowering of said arms serving to rest the second mold on said power driven rollers.

8. Apparatus for moving cylindrical molds to and from a spinning station defined by power driven rollers cooperating to support and spin the molds about a horizontal axis, comprising in combination: loading rails leading to the spinning station, discharge rails leading away from the spinning station, the molds being adapted to roll on both the loading rails and the discharge rails, transfer means including pivoted arms extending in a direction parallel to the rails, power means for swinging said arms between a lowered position and an elevated position, said arms being engageable with the outer surfaces of two of the cylindrical molds during one stroke of the arms, the first mold being supported on the power driven rollers at the spinning station and the second mold being supported on the loading rails, a gravity-actuated trigger pivotally mounted on each of said arms intermediate the ends thereof and acting to limit the extent of rolling movement of the second mold on said rails, whereby raising of the pivoted arms from lowered position to elevated position serves to lift the first mold and roll it onto the discharge rails and to raise the second mold and cause it to roll along said arms to said triggers, and subsequent lowering of said arms serving to rest the second mold on said power driven rollers.

References Cited in the file of this patent
UNITED STATES PATENTS

| | | |
|---|---|---|
| 278,022 | Kline | May 22, 1883 |
| 730,317 | Thomas | June 9, 1903 |
| 765,332 | Bradley | July 19, 1904 |
| 1,735,969 | Hurst et al. | Nov. 19, 1929 |
| 1,944,168 | Camerota | Jan. 23, 1934 |
| 2,142,416 | Russell | Jan. 3, 1939 |
| 2,405,141 | Hibbard | Aug. 6, 1946 |
| 2,613,410 | Johnston | Oct. 14, 1952 |
| 2,751,781 | McConnell | June 26, 1956 |
| 2,849,769 | Lasater et al. | Sept. 2, 1958 |
| 2,854,710 | Johnston | Oct. 7, 1958 |
| 2,870,496 | Cooper et al. | Jan. 27, 1959 |
| 2,875,482 | Hamilton et al. | Mar. 3, 1959 |